US012732225B2

(12) United States Patent
Cheng

(10) Patent No.: US 12,732,225 B2
(45) Date of Patent: Sep. 8, 2026

(54) METHOD FOR PERFORMING MEDIUM ACCESS CONTROL PROTOCOL DATA UNIT DISPATCH CONTROL IN MULTI-LINK OPERATION ARCHITECTURE, AND ASSOCIATED APPARATUS

(71) Applicant: MEDIATEK INC., Hsin-Chu (TW)

(72) Inventor: Shu-Min Cheng, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 446 days.

(21) Appl. No.: 18/376,837

(22) Filed: Oct. 5, 2023

(65) Prior Publication Data

US 2024/0187034 A1 Jun. 6, 2024

Related U.S. Application Data

(60) Provisional application No. 63/385,795, filed on Dec. 2, 2022.

(51) Int. Cl.
*H04B 1/401* (2015.01)

(52) U.S. Cl.
CPC .................................... *H04B 1/401* (2013.01)

(58) Field of Classification Search
CPC .... H04B 1/401; H04L 1/1614; H04W 28/082; H04W 76/15; H04W 84/12
See application file for complete search history.

(56) References Cited

U.S. PATENT DOCUMENTS

2021/0377856 A1* 12/2021 Chu .................. H04W 52/0216
2023/0328669 A1* 10/2023 Naik ................. H04W 56/0015 370/350
2023/0379999 A1 11/2023 Kim
2024/0049316 A1* 2/2024 Ajami .................. H04W 76/15
(Continued)

FOREIGN PATENT DOCUMENTS

WO 2022/164293 A1 8/2022

OTHER PUBLICATIONS

Yongho Seok (MediaTek Inc.) et al, PDT Hybrid EMLSR Mode, IEEE P802.11 Wireless LANs, doc.: IEEE 802.11-21/1895r0, Sep. 21, 2021, XP068187370 ,Sep. 21, 2021.

*Primary Examiner* — Nguyen T Vo
(74) *Attorney, Agent, or Firm* — Winston Hsu

(57) ABSTRACT

A method for performing medium access control (MAC) protocol data unit (MPDU) dispatch control in multi-link operation architecture and associated apparatus are provided. The method applicable to a wireless transceiver device within a wireless communications system may include: utilizing the wireless transceiver device to communicate with another device within the wireless communications system, to allow data transmission between the wireless transceiver device and the other device through at least one portion of links among multiple links respectively corresponding to multiple predetermined radio frequency bands; and performing a dispatch control procedure to dispatch multiple MAC protocol data units (MPDUs) into multiple physical layer (PHY) protocol data units (PPDUs) corresponding to a set of selected links according to at least one predetermined rule in a predetermined mode of the wireless transceiver device, for sending the multiple PPDUs to the other device through the set of selected links.

11 Claims, 11 Drawing Sheets

(56) References Cited

U.S. PATENT DOCUMENTS

| | | | | |
|---|---|---|---|---|
| 2024/0137860 | A1 * | 4/2024 | Asterjadhi | H04W 52/0206 |
| 2024/0155713 | A1 * | 5/2024 | Naik | H04W 76/20 |
| 2025/0358879 | A1 * | 11/2025 | Kim | H04L 1/1864 |

* cited by examiner

METHOD FOR PERFORMING MEDIUM ACCESS CONTROL PROTOCOL DATA UNIT DISPATCH CONTROL IN MULTI-LINK OPERATION ARCHITECTURE, AND ASSOCIATED APPARATUS

CROSS REFERENCE TO RELATED APPLICATIONS

This application claims the benefit of U.S. Provisional Application No. 63/385,795, filed on Dec. 2, 2022. The content of the application is incorporated herein by reference.

BACKGROUND

The present invention is related to communications control, and more particularly, to a method for performing medium access control (MAC) protocol data unit (MPDU) dispatch control in multi-link operation (MLO) architecture, and associated apparatus such as an access point (AP) device and a station (STA) device.

According to the related art, a wireless communications device in a wireless local area network (WLAN) may try sending data to another wireless communications device through multiple links, and partial data corresponding to block ack (or acknowledgment) windows among the data may be sent to the other wireless communications device, respectively. However, some problems such as reduced performance may occur if some operations of the wireless communications device are not properly controlled. Thus, a novel method and associated architecture are needed for solving the problems without introducing any side effect or in a way that is less likely to introduce a side effect.

SUMMARY

It is an objective of the present invention to provide a method for performing MPDU dispatch control in MLO architecture, and associated apparatus such as an AP device and a STA device, in order to solve the above-mentioned problem.

At least one embodiment of the present invention provides a method for performing MPDU dispatch control in MLO architecture, where the method can be applied to a wireless transceiver device within a wireless communications system. For example, the method may comprise: utilizing the wireless transceiver device to communicate with another device within the wireless communications system, to allow data transmission between the wireless transceiver device and the other device through at least one portion of links among multiple links respectively corresponding to multiple predetermined radio frequency bands; and performing a dispatch control procedure to dispatch multiple MAC protocol data units (MPDUs) into multiple physical layer (PHY) protocol data units (PPDUs) corresponding to a set of selected links according to at least one predetermined rule in a predetermined mode of the wireless transceiver device, for sending the multiple PPDUs to the other device through the set of selected links.

According to some embodiments, the present invention also provides the wireless transceiver device that operates according to the above method, where the wireless transceiver device may be a multi-link device (MLD).

At least one embodiment of the present invention provides a wireless transceiver device for performing MPDU dispatch control in MLO architecture, where the wireless transceiver device is one of multiple devices (e.g., multi-link devices (MLDs)) within a wireless communications system. The wireless transceiver device may comprise a processing circuit that is arranged to control operations of the wireless transceiver device. The wireless transceiver device may further comprise at least one communications control circuit that is coupled to the processing circuit and arranged to perform communications control, wherein the at least one communications control circuit is arranged to perform wireless communications operations with another device among the multiple devices for the wireless transceiver device. For example, the wireless transceiver device is arranged to communicate with the other device, to allow data transmission between the wireless transceiver device and the other device through at least one portion of links among multiple links respectively corresponding to multiple predetermined radio frequency bands; and the wireless transceiver device is arranged to perform a dispatch control procedure to dispatch multiple MPDUs into multiple PPDUs corresponding to a set of selected links according to at least one predetermined rule in a predetermined mode of the wireless transceiver device, for sending the multiple PPDUs to the other device through the set of selected links.

According to some embodiments, the apparatus may comprise at least one portion (e.g., a portion or all) of the wireless communications system. For example, the apparatus may represent a portion of the wireless communications system, such as the wireless transceiver device (e.g., an AP device or a STA device). In some examples, the apparatus may represent the whole of the wireless communications system.

It is an advantage of the present invention that, through proper design, the present invention method, as well as the associated apparatus such as the wireless transceiver device, can adaptively control dispatching behaviors, and more particularly, send PPDUs carrying dynamically dispatched MPDUs with adequate or sufficient numbers of sequence numbers (SNs) in a block acknowledgment (BA) window from one MLD to another MLD through a set of selected links, to make the other MLD receive data as much as possible with promptness, in order to achieve a better communications result, and therefore enhance the overall performance. In addition, the present invention method and apparatus can solve the related art problem without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms “include” and “comprise” are used in an open-ended fashion, and thus should be interpreted to mean “include, but not limited to . . . ”. Also, the term “couple” is intended to mean either an indirect or direct electrical connection. Accordingly, if one device is coupled to another device, that connection may be through a direct electrical connection, or through an indirect electrical connection via other devices and connections.

Figure 1:
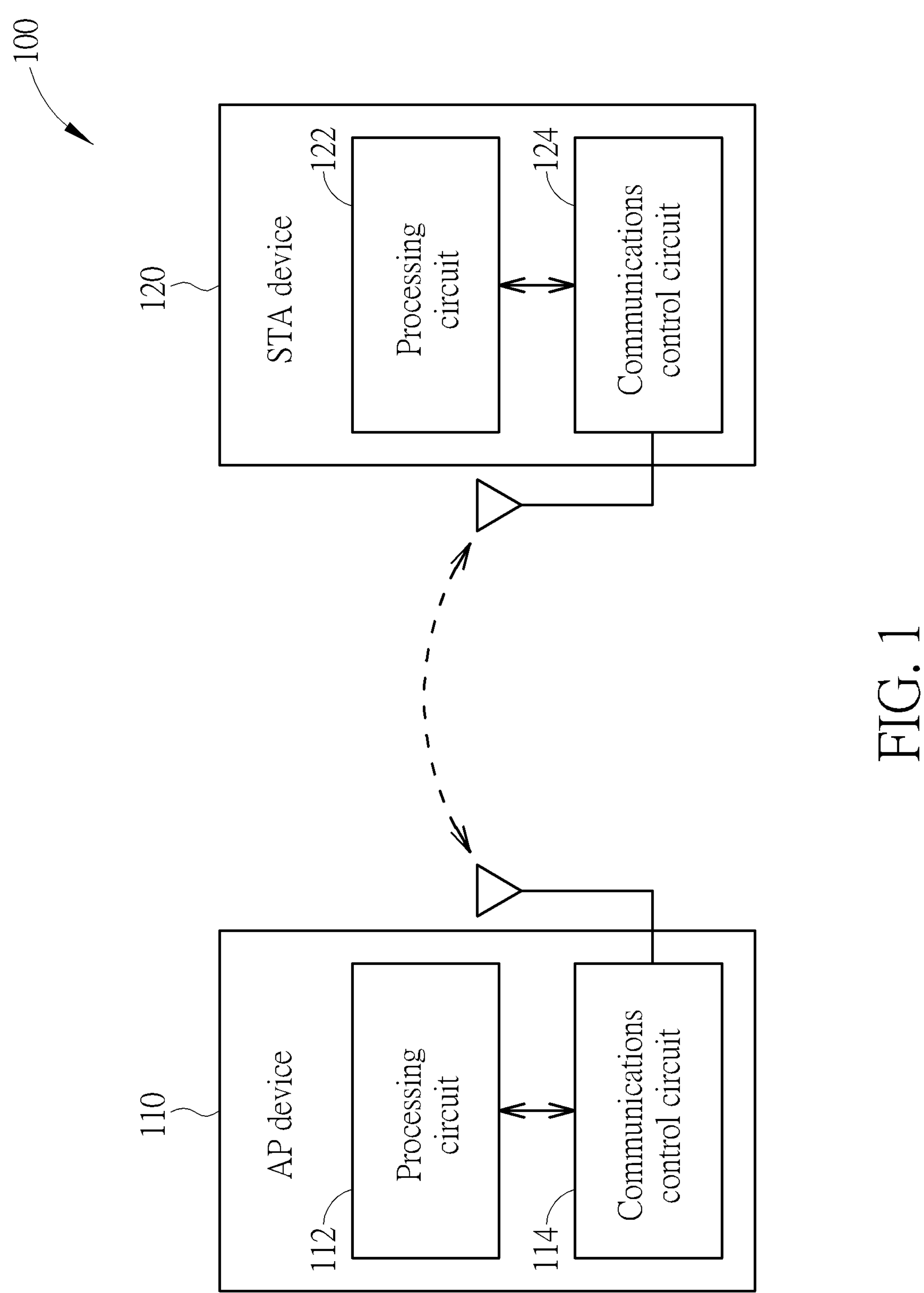
FIG. 1 is a diagram of a wireless communications system according to an embodiment of the present invention.

FIG. 1 is a diagram of a wireless communications system 100 according to an embodiment of the present invention. For better comprehension, the wireless communications system 100, as well as any wireless transceiver device therein, may be compatible or back-compatible to one or more versions of the Institute of Electrical and Electronics Engineers (IEEE) 802.11 standards, but the present invention is not limited thereto. The wireless communications system 100 may comprise multiple wireless transceiver devices. As shown in FIG. 1, the multiple wireless transceiver devices within the wireless communications system 100 may comprise the AP device 110 and the STA device 120, where the AP device 110 may comprise a processing circuit 112, at least one communications control circuit (e.g., one or more communications control circuits), which may be collectively referred to as the communications control circuit 114, and at least one antenna (e.g., one or more antennas) of the communications control circuit 114, and the STA device 120 may comprise a processing circuit 122, at least one communications control circuit (e.g., one or more communications control circuits), which may be collectively referred to as the communications control circuit 124, and at least one antenna (e.g., one or more antennas) of the communications control circuit 124.

In the architecture shown in FIG. 1, the processing circuit 112 can be arranged to control operations of the AP device 110 to make the AP device 110 act as at least one AP in the wireless communications system 100, such as multiple APs integrated into the AP device 110, and the communications control circuit 114 can be arranged to perform communications control, and more particularly, perform wireless communications operations with the STA device 120 (or the communications control circuit 124 thereof) for the AP device 110. In addition, the processing circuit 122 can be arranged to control operations of the STA device 120 to make the STA device 120 act as at least one STA in the wireless communications system 100, such as multiple STAs integrated into the STA device 120, and the communications control circuit 124 can be arranged to perform communications control, and more particularly, perform wireless communications operations with the AP device 110 (or the communications control circuit 114 thereof) for the STA device 120.

According to some embodiments, the processing circuit 112 can be implemented by way of at least one processor/microprocessor, at least one random access memory (RAM), at least one bus, etc., and the communications control circuit 114 can be implemented by way of at least one wireless network control circuit and at least one wired network control circuit, but the present invention is not limited thereto. Examples of the AP device 110 may include, but are not limited to: a Wi-Fi router. In addition, the processing circuit 122 can be implemented by way of at least one processor/microprocessor, at least one RAM, at least one bus, etc., and the communications control circuit 124 can be implemented by way of at least one wireless network control circuit, but the present invention is not limited thereto. Examples of the STA device 120 may include, but are not limited to: a multifunctional mobile phone, a laptop computer, an all-in-one computer and a wearable device.

As shown in FIG. 1, the multiple wireless transceiver devices within the wireless communications system 100 may comprise the AP device 110 and the STA device 120. This is for illustrative purposes only, and is not meant to be a limitation of the present invention. According to some embodiments, the multiple wireless transceiver devices within the wireless communications system 100 may be implemented by way of multiple multi-link devices (MLDs).

Figure 2:
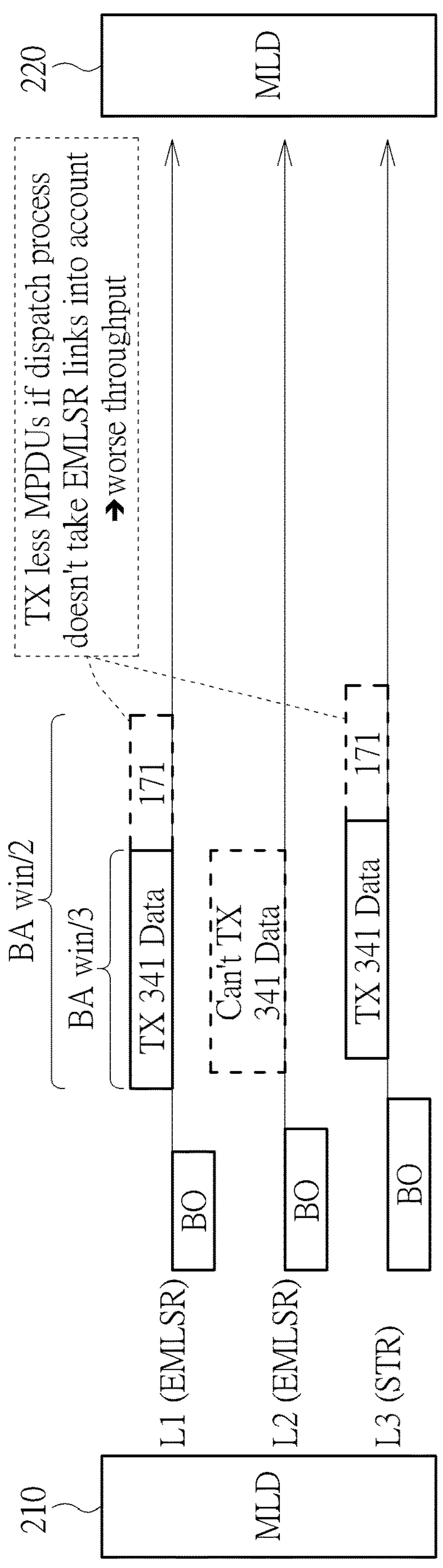
FIG. 2 is a diagram illustrating a MLO control scheme.

FIG. 2 is a diagram illustrating a MLO control scheme. For better comprehension, any two wireless transceiver devices (e.g., the AP device 110 and the STA device 120) among the multiple wireless transceiver devices within the wireless communications system 100 may be implemented as the multi-link devices (MLDs) 210 and 220. For example, when the AP device 110 and the STA device 120 are implemented as the MLDs 210 and 220, the MLD 210 may be an AP MLD comprising multiple APs {AP(i)}, and the MLD 220 may be a non-AP MLD comprising multiple STAs {STA(i)}, where the MLDs 210 and 220 may communicate with each other to establish or set up multiple links {L(i)} between the multiple APs {AP(i)} and the multiple STAs {STA(i)}, such as the multiple links {L(i)} corresponding to multiple predetermined radio frequency bands (e.g., the 2.4 gigahertz (GHz) band, the 5 GHz band and the 6 GHz band), but the present invention is not limited thereto. For example, the multiple links {L(i)} may comprise the links {L(1), L(2), L(3)}, which may be referred to as the links {L1, L2, L3} for brevity. In some examples, the total link count $LCNT_{TOTAL}$ such as the total number of the multiple links {L(i)} may vary, and more particularly, may increase to be greater than three, and the multiple links {L(i)} may comprise more links such as the links {L(1), L(2), L(3), L(4)}, which may be referred to as the links {L1, L2, L3, L4} for brevity. According to some embodiments, when the AP device 110 and the STA device 120 are implemented as the MLDs 220 and 210, the MLD 220 may be the AP MLD comprising the multiple APs {AP(i)}, and the MLD 210 may be the non-AP MLD comprising the multiple STAs {STA(i)}.

In addition, among the MLDs 210 and 220, a transmitting MLD may maintain one sequence number space for each traffic identifier (TID) that may be transmitted to a peer receiving MLD over one or more links subject to TID to link mapping negotiated between the transmitting MLD and the peer receiving MLD. Additionally, among the MLDs 210 and 220, an initiating MLD shall maintain one transmission window for each block acknowledgment (BA) agreement negotiated with the responding MLD to submit MPDUs for transmission across links subjected to the TID to link mapping negotiated between the initiating MLD and the responding MLD. For example, the MLD 210 may be arranged to send a plurality of PPDUs carrying a plurality of MPDUs to the MLD 220 through the multiple links {L(i)} in accordance with multiple BA windows. When receiving a set of MPDUs corresponding to a BA window among the plurality of MPDUs from the MLD 210 through at least one portion of links among the multiple links {L(i)} (e.g. the links L1, L2 and L3), the MLD 220 may transmit a BA frame (or BA) to the MLD 210, where different links such as the links L1, L2 and L3 may share the same BA window. The BA (or BA frame) may carry a BA bitmap, for indicating the acknowledgments regarding the set of MPDUs, respectively, but the present invention is not limited thereto.

selected from a set of predetermined BA bitmap capabilities such as 32, 64, 128, 256, 512 and 1024. For example, when the capability of the BA bitmap is equal to 32, the BA may be arranged to acknowledge up to 32 MPDUs received by the peer receiving MLD; when the capability of the BA bitmap is equal to 64, the BA may be arranged to acknowledge up to 64 MPDUs received by the peer receiving MLD; and the rest may be deduced by analogy, for example, when the capability of the BA bitmap is equal to 1024, the BA may be arranged to acknowledge up to 1024 MPDUs received by the peer receiving MLD. The number of MPDUs in a PPDU may be much less than the capability of the BA bitmap (or the BA window).

In the architecture shown in FIG. 2, after negotiation between the MLDs 210 and 220, any link L(i) among the multiple links {L(i)} (e.g. the links L1, L2 and L3) may be configured as a predetermined type of link. More particularly, the aforementioned any wireless transceiver device such as any MLD among the MLDs 210 and 220 may operate in a predetermined mode such as a hybrid mode. In the hybrid mode, at least two links (e.g. the links L1 and L2) among the multiple links {L(i)} may be enhanced multi-link single radio (EMLSR) links, both of a first link (e.g. the link L1) among the aforementioned at least two links and a third link (e.g. the link L3) among the multiple links {L(i)} may be simultaneous transmit and receive (STR) links and may be regarded as a first STR link pair, and both of a second link (e.g. the link L2) among the aforementioned at least two links and the third link (e.g. the link L3) may be STR links and may be regarded as a second STR link pair. Assuming that the links L1, L2 and L3 may represent a 6-GHz link corresponding to the 6 GHz band, a 5-GHz link corresponding to the 5 GHz band and a 2.4-GHz link corresponding to the 2.4 GHz band, respectively, the MLDs 210 and 220 may operate in the hybrid mode to configure the links L1, L2 and L3 as follows:

TABLE 1

| B0 | B1 | B2 | B3 | B4 | B5 | B6 | B7 | B8 | B9 | B10 | B11 | B12 | B15 | B14 | B15 |
|---|---|---|---|---|---|---|---|---|---|---|---|---|---|---|---|
| Fragment Number | | | | | | | | Sequence Number | | | | | | | |

Table 1 illustrates an example of a Sequence Control field format. There may be 16 bits B0-B15 in the Sequence Control field, and the Sequence Control field may comprise two subfields, such as the Fragment Number subfield at the bits B0-B3 and the Sequence Number subfield at the bits B4-B15, for carrying the fragment number and the sequence number, respectively. For example, a PPDU sent by the transmitting MLD among the MLDs 210 and 220 may comprise a PHY header and an aggregate MAC protocol data units (A-MPDU) such as a combination of multiple MPDU subframes, an MPDU subframe among the multiple MPDU subframes may comprise an MPDU delimiter and an MPDU (in particular, with a padding coming after the MPDU), the MPDU may comprise a MAC header and an A-MSDU such as a combination of multiple MSDU subframes (in particular, with a frame check sequence (FCS) coming after the A-MSDU), and a MSDU subframe among the multiple MSDU subframes may comprise a subframe header and a MSDU (in particular, with a padding coming after the MSDU), where the Sequence Control field may be one of multiple fields of the MAC header within the MPDU carried by the PPDU. As the multiple MPDU subframes may be arranged to carry multiple MPDUs, respectively, multiple sequence numbers (SNs) may be assigned to the multiple MPDUs in the PPDU, respectively. As a result, any MPDU among the multiple MPDUs may correspond to one SN among the multiple SNs. In addition, the peer receiving MLD among the multiple multi-link devices MLDs may return a BA to the transmitting MLD, and use the BA to notify the transmitting MLD of the correctness of the multiple MPDUs received from the transmitting MLD by the peer receiving MLD. When receiving the BA from the peer receiving MLD, the transmitting MLD may have sufficient information regarding which MPDUs have been correctly received by the peer receiving MLD, and send a series of MPDUs starting from the first MPDU that should be retransmitted according to the SNs.

The BA bitmap in the BA may correspond to a BA window, and the capability of the BA bitmap may be (1) the link L1 such as the 6-GHz link and the link L2 such as the 5-GHz link may be configured as EMLSR links;

(2) the link L1 such as the 6-GHz link and the link L3 such as the 2.4-GHz link may be configured as STR links, where the 6-GHz link and the 2.4-GHz link may be taken as an example of the first STR link pair, and the data transmission from the MLD 210 to the MLD 220 through one link (e.g., the 6-GHz link) in the first STR link pair and the data transmission from the MLD 210 to the MLD 220 through another link (e.g., the 2.4-GHz link) in the first STR link pair may be performed at the same time; and (3) the link L2 such as the 5-GHz link and the link L3 such as the 2.4-GHz link may be configured as STR links, where the 5-GHz link and the 2.4-GHz link may be taken as an example of the second STR link pair, and the data transmission from the MLD 210 to the MLD 220 through one link (e.g., the 5-GHz link) in the second STR link pair and the data transmission from the MLD 210 to the MLD 220 through another link (e.g., the 2.4-GHz link) in the second STR link pair may be performed at the same time;

but the present invention is not limited thereto. According to some embodiments, the link-type configuration of the multiple links {L(i)} (e.g. the links L1, L2 and L3) may vary.

In addition, it is typically needed to perform real-time traffic dispatch for throughput optimization under MLO. For example, the capability of the BA bitmap may be equal to 1024, and the MLD 210 operating according to the MLO control scheme may dispatch 1024 MPDUs with sequence numbers {0, 1, . . . , 1023} into a set of PPDUs, for sending the set of PPDUs carrying the 1024 MPDUs to the MLD 210 through at least one portion of links among the links L1, L2 and L3. For better comprehension, it may be assumed that the respective capabilities (e.g., bandwidths) of the links L1, L2 and L3 are equal to each other, but the present invention is not limited thereto. If the MLD 210 is arranged to dispatch the traffic to all of the links L1, L2 and L3, it may be expected to dispatch MPDUs corresponding to one third of the BA window per link (labeled "BA win/3" for brevity), for example, 341 MPDUs per link (labeled "TX 341 Data" for brevity). When the MLD 210 is operating in the hybrid mode, the traffic may be transmitted over only one EMLSR link (e.g. the link L1) among all EMLSR links as well as the non-EMLSR link(s) (e.g. the link L3). In this situation, the MLD 210 cannot dispatch any MPDU to the other EMLSR link(s) (e.g. the link L2), and more particularly, cannot dispatch 341 MPDUs to the link L2 (labeled "Can't TX 341 Data" for brevity), where there may be severe interference between the link L1 such as the 6-GHz link and the link L2 such as the 5-GHz link. Therefore, in the hybrid mode, if the dispatch process does not take EMLSR links into account, the MLD 210 may transmit less MPDUs (labeled "TX less MPDUs" for brevity), causing the throughput to be reduced. According to some embodiments, the aforementioned any wireless transceiver device such as the aforementioned any MLD among the MLDs 210 and 220 may perform MPDU dispatch control properly in the predetermined mode such as the hybrid mode, and more particularly, dispatch MPDUs corresponding to a half of the BA window per link among the links L1 and L3 (labeled "BA win/2" for brevity), for example, 341 MPDUs plus 171 additional MPDUs (labeled "171" for brevity) per link among the links L1 and L3, to enhance the overall performance.

Figure 3:
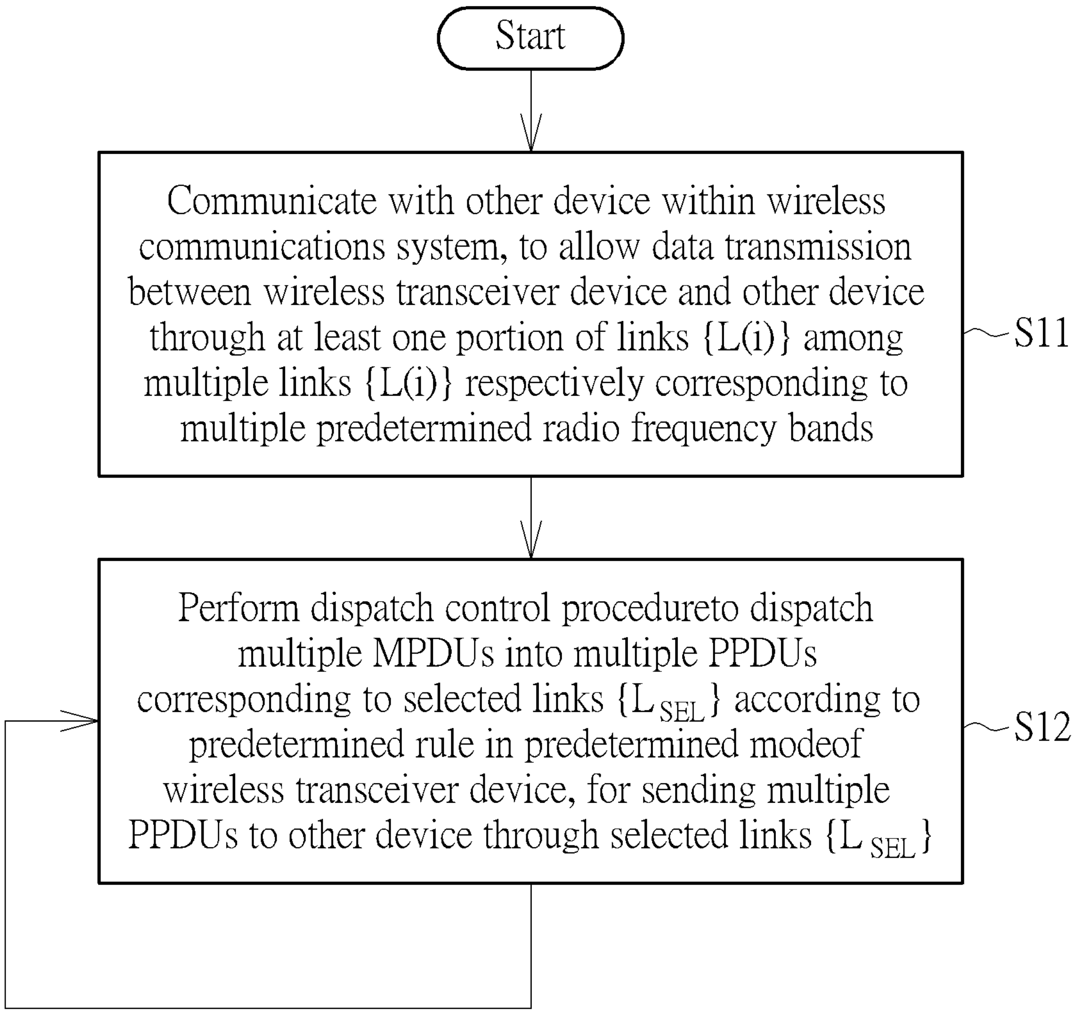
FIG. 3 illustrates a flow chart of a method for performing MPDU dispatch control in MLO architecture according to an embodiment of the present invention.

FIG. 3 illustrates a flow chart of a method for performing MPDU dispatch control in MLO architecture according to an embodiment of the present invention. The aforementioned any wireless transceiver device in the wireless communications system 100, such as the aforementioned any MLD among the MLDs 210 and 220, may perform a dispatching management procedure of the method, and more particularly, adaptively determine multiple selected links $\{L_{SEL}\}$ among the multiple links {L(i)} for performing dispatching, and send partial data among the data corresponding to the TID N to another device (e.g., the other MLD among the MLDs 210 and 220) within the wireless communications system 100 in real time.

In Step S11, the wireless transceiver device (e.g., the MLD 210) may communicate with the other device (e.g., the MLD 220) within the wireless communications system 100, to allow data transmission between the wireless transceiver device and the other device through at least one portion of links {L(i)} among the multiple links {L(i)} respectively corresponding to the multiple predetermined radio frequency bands (e.g., the 2.4 GHz band, the 5 GHz band and the 6 GHz band).

In Step S12, the wireless transceiver device (e.g., the MLD 210) may perform a dispatch control procedure to dispatch multiple MPDUs into multiple PPDUs corresponding to a set of selected links $\{L_{SEL}\}$ according to at least one predetermined rule (e.g., one or more predetermined rules) in the predetermined mode of the wireless transceiver device, for sending the multiple PPDUs to the other device (e.g., the MLD 220) through the set of selected links $\{L_{SEL}\}$, where the set of selected links $\{L_{SEL}\}$ may be selected from the multiple links {L(i)}, and a link count $LCNT_{SEL}$ of the set of selected links $\{L_{SEL}\}$ may be less than or equal to the total link count $LCNT_{TOTAL}$ of the multiple links {L(i)}.

The predetermined mode may represent the hybrid mode in which the multiple links {L(i)} comprise multiple EMLSR links and at least one STR link (e.g., one or more STR links). For example, the wireless transceiver device (e.g., the MLD 210) may be arranged to configure one of the multiple EMLSR links and STR links in the hybrid mode, but the present invention is not limited thereto. In some examples, the wireless transceiver device (e.g., the MLD 210) may be arranged to configure one of the multiple EMLSR links and a first STR link among the aforementioned at least one STR link to be an STR link pair in the hybrid mode. More particularly, according to the aforementioned at least one predetermined rule, the wireless transceiver device (e.g., the MLD 210) may dispatch a one set of MPDUs (e.g., a set of MPDUs within the BA window) among the multiple MPDUs into a first EMLSR link among the multiple EMLSR links, without dispatching any MPDU among the multiple MPDUs into any other EMLSR link among the multiple EMLSR links.

As illustrated with the loop shown in FIG. 3, the wireless transceiver device (e.g., the MLD 210) may execute Step S12 multiple times, for dispatching more than one set of MPDUs within the same BA window, but the present invention is not limited thereto. For example, the multiple MPDUs may represent a group of MPDUs, and the multiple PPDUs may represent multiple first PPDUs into which the group of MPDUs are dispatched. When executing Step S12 another time, the wireless transceiver device (e.g., the MLD 210) may perform the dispatch control procedure to dispatch another group of MPDUs into multiple second PPDUs corresponding to the set of selected links $\{L_{SEL}\}$ according to the aforementioned at least one predetermined rule in the predetermined mode of the wireless transceiver device, for sending the multiple second PPDUs to the other device (e.g., the MLD 220) through the set of selected links $\{L_{SEL}\}$. According to some embodiments, a series of MPDUs with a series of sequence numbers (SNs) may comprise the group of MPDUs, the other group of MPDUs, etc. with SNs in a first BA window among multiple BA windows, and further comprise the more groups of MPDUs with SNs in a second BA window among the multiple BA windows.

For better comprehension, the method may be illustrated with the working flow shown in FIG. 3, but the present invention is not limited thereto. According to some embodiments, one or more steps may be added, deleted, or changed in the working flow shown in FIG. 3. For example, the wireless transceiver device (e.g., the MLD 210) may adaptively determine the set of selected links $\{L_{SEL}\}$ in the loop comprising Step S12, and more particularly, adaptively adjust the link count $LCNT_{SEL}$ of the set of selected links $\{L_{SEL}\}$ in the loop comprising Step S12. In addition, according to the aforementioned at least one predetermined rule, the wireless transceiver device (e.g., the MLD 210) may be arranged to dispatch the one set of MPDUs among the multiple MPDUs into one EMLSR link among the multiple EMLSR links. For brevity, similar descriptions for these embodiments are not repeated in detail here.

Figure 4:
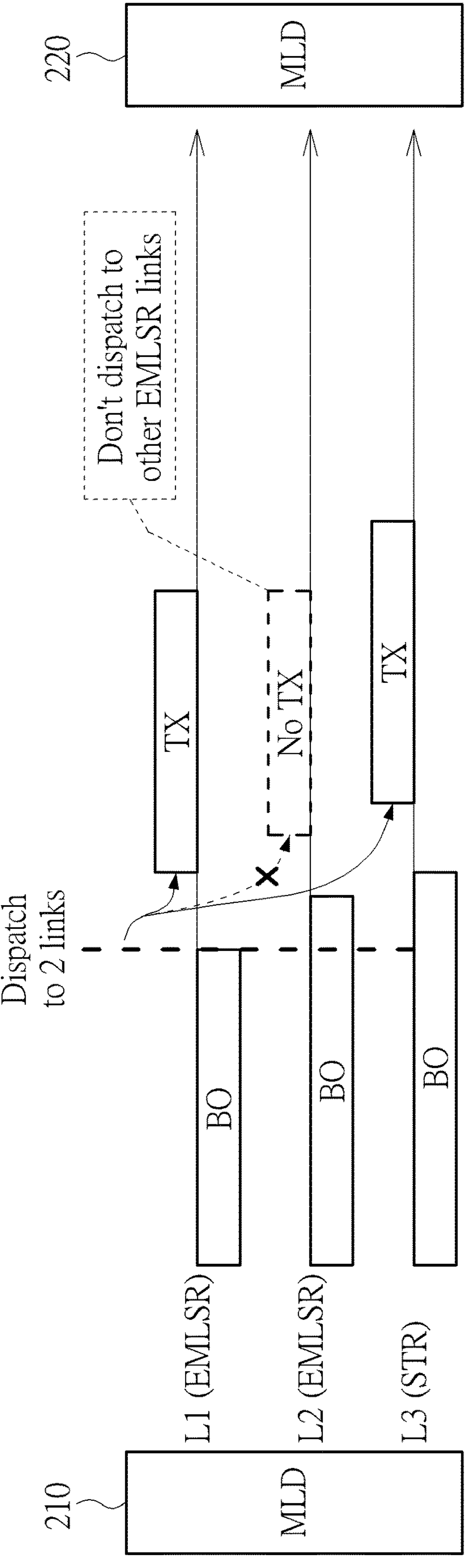
FIG. 4 is a diagram illustrating a first control scheme of the method according to an embodiment of the present invention.

FIG. 4 is a diagram illustrating a first control scheme of the method according to an embodiment of the present invention. For example, the multiple links {L(i)} may comprise the links {L1, L2, L3}. In addition, according to the aforementioned at least one predetermined rule, the wireless transceiver device (e.g., the MLD 210) may dispatch the one set of MPDUs into the first EMLSR link (e.g., the link L1), without dispatching any MPDU among the multiple MPDUs into any other EMLSR link (e.g., the link L2) among the multiple EMLSR links, and may dispatch another set of MPDUs (e.g., any set of at least one other set of MPDUs within the BA window) among the multiple MPDUs into the aforementioned at least one STR link such as the link L3.

As shown in FIG. 4, according to the aforementioned at least one predetermined rule, the wireless transceiver device (e.g., the MLD 210) may dispatch the one set of MPDUs into the first EMLSR link (e.g., the link L1) and dispatch the other set of MPDUs into the first STR link (e.g., the link L3) among the at least one STR link, and more particularly, transmit a first PPDU carrying the one set of MPDUs to the other device (e.g., the MLD 220) through the first EMLSR link such as the link L1 and transmit a second PPDU carrying the other set of MPDUs to the other device (e.g., the MLD 220) through the first STR link such as the link L3 (labeled "TX" for brevity). In addition, the wireless transceiver device (e.g., the MLD 210) may prevent dispatching any MPDU among the multiple MPDUs into any other EMLSR link(s) such as the link L2, and prevent transmitting any PPDU carrying any MPDU to the other device (e.g., the MLD 220) through any other EMLSR link(s) such as the link L2 (labeled "No TX" for brevity).

For example, the capability of the BA bitmap may be equal to 1024, and the MLD 210 operating according to the first control scheme may dispatch 1024 MPDUs with sequence numbers {0, 1, . . . , 1023} into a set of PPDUs, for sending the set of PPDUs carrying the 1024 MPDUs to the MLD 210 through the set of selected links $\{L_{SEL}\}$ (e.g., links L1 and L3) among the multiple links {L(i)} (e.g., the links L1, L2 and L3). In the predetermined mode such as the hybrid mode, the MLD 210 may perform the MPDU dispatch control properly to dispatch 512 MPDUs corresponding to a half of the BA window per link among the set of selected links $\{L_{SEL}\}$ (e.g., links L1 and L3). As a result, the MLD 210 may dispatch the 1024 MPDUs to two links L1 and L3.

In addition, the MLD 210 may monitor multiple backoff counters respectively corresponding to the multiple links {L(i)} (e.g., the links L1, L2 and L3), to determine the progress of the counting operations (e.g., countdown operations) of the backoff counters (labeled "BO" for brevity), respectively. For example, among the backoff counter values { Backoff_CNT(i)} of the backoff counters {BC(i)} respectively corresponding to the multiple links {L(i)} (e.g., the links L1, L2 and L3), a first backoff counter value Backoff_CNT1 of a first backoff counter BC1 corresponding to the first EMLSR link (e.g., the link L1) may reach a predetermined backoff termination value (e.g., zero) first, a second backoff counter value Backoff_CNT2 of a second backoff counter BC2 corresponding to the other EMLSR link (e.g., the link L2) may reach the predetermined backoff termination value afterward, and a third backoff counter value Backoff_CNT3 of a third backoff counter BC3 corresponding to the first STR link (e.g., the link L3) may reach the predetermined backoff termination value later. At the time point indicated by the vertical dashed line, as Backoff_CNT1=0, the MLD 210 may select the first EMLSR link (e.g., the link L1) as a member of the set of selected links $\{L_{SEL}\}$, and therefore prevent selecting the other EMLSR link (e.g., the link L2) to be any member of the set of selected links $\{L_{SEL}\}$, and further select the first STR link (e.g., the link L3) to be another member of the set of selected links $\{L_{SEL}\}$, but the present invention is not limited thereto. According to some embodiments, at any time point at which none of the backoff counter values Backoff_CNT1, Backoff_CNT2 and Backoff_CNT3 reaches the predetermined backoff termination value, the MLD 210 may detect that Backoff_CNT1<Backoff_CNT2<Backoff_CNT3 and that the first backoff counter value Backoff_CNT1 is the minimum among the first two backoff counter values Backoff_CNT1 and Backoff_CNT2, and therefore determine that the first EMLSR link (e.g., the link L1) has the best opportunity for data transmission among the multiple EMLSR links (e.g., the links L1 and L2). In this situation, the MLD 210 may select the first EMLSR link (e.g., the link L1) as a member of the set of selected links $\{L_{SEL}\}$, and therefore prevent selecting the other EMLSR link (e.g., the link L2) to be any member of the set of selected links $\{L_{SEL}\}$, and further select the first STR link (e.g., the link L3) to be another member of the set of selected links $\{L_{SEL}\}$.

Figure 5:
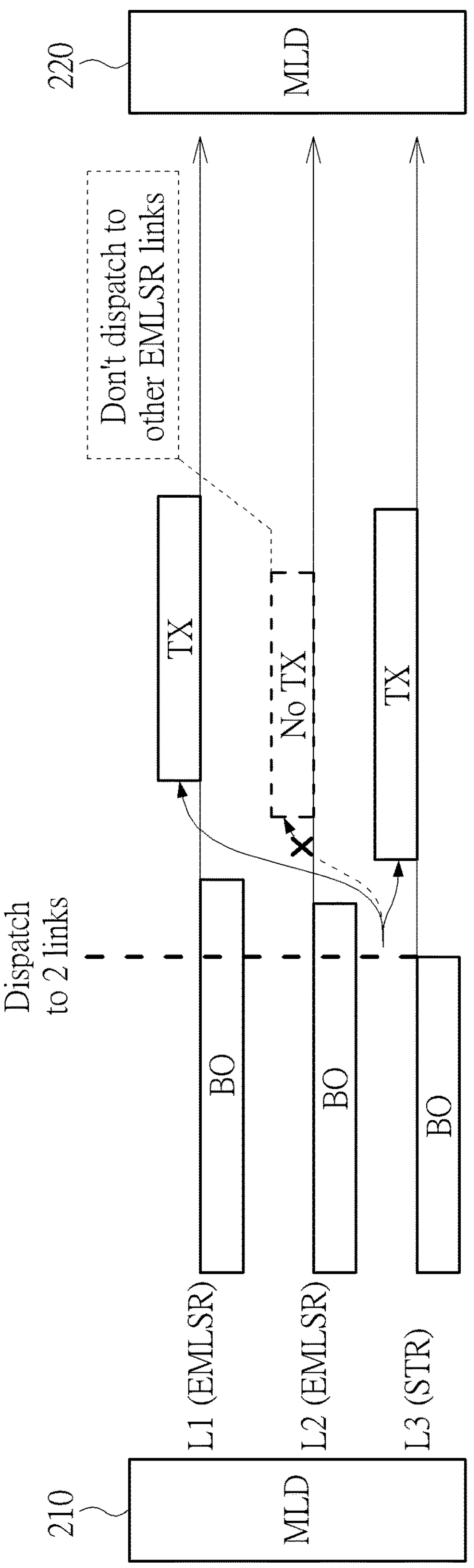
FIG. 5 is a diagram illustrating a second control scheme of the method according to an embodiment of the present invention.

FIG. 5 is a diagram illustrating a second control scheme of the method according to an embodiment of the present invention. In comparison with the embodiment shown in FIG. 4, the progress of the counting operations (e.g., the countdown operations) of the backoff counters may vary. For example, among the backoff counter values {Backoff_CNT(i)} of the backoff counters {BC(i)} respectively corresponding to the multiple links {L(i)} (e.g., the links L1, L2 and L3), the third backoff counter value Backoff_CNT3 of the third backoff counter BC3 corresponding to the first STR link (e.g., the link L3) may reach the predetermined backoff termination value (e.g., zero) first, the second backoff counter value Backoff_CNT2 of the second backoff counter BC2 corresponding to the other EMLSR link (e.g., the link L2) may reach the predetermined backoff termination value afterward, and the first backoff counter value Backoff_CNT1 of the first backoff counter BC1 corresponding to the first EMLSR link (e.g., the link L1) may reach the predetermined backoff termination value later. At the time point indicated by the vertical dashed line, as Backoff_CNT3=0, the MLD 210 may select the first STR link (e.g., the link L3) to be a member of the set of selected links $\{L_{SEL}\}$. In addition, the MLD 210 may select the first EMLSR link (e.g., the link L1) as another member of the set of selected links $\{L_{SEL}\}$, and therefore prevent selecting the other EMLSR link (e.g., the link L2) to be any member of the set of selected links $\{L_{SEL}\}$, where FIG. 5 may be arranged to only illustrate some operations of the method regarding selecting one link of the EMLSR link pair, and does not introduce the decision of backoff count, but the present invention is not limited thereto. According to some embodiments, when Backoff_CNT2<Backoff_CNT1 and the second backoff counter value Backoff_CNT2 is the minimum among the two backoff counter values Backoff_CNT1 and Backoff_CNT2, the associated operations may vary.

More particularly, according to the aforementioned at least one predetermined rule, the wireless transceiver device (e.g., the MLD 210) may dispatch the one set of MPDUs into the first EMLSR link (e.g., the link L1) and dispatch the other set of MPDUs among the multiple MPDUs into the first STR link (e.g., the link L3) among the aforementioned at least one STR link, no matter whether the first backoff counter value Backoff_CNT1 of the first backoff counter BC1 corresponding to the first EMLSR link (e.g., the link L1) reaches the predetermined backoff termination value (e.g., zero) first among the backoff counter values {Backoff_CNT(i)} of all backoff counters {BC(i)} respectively corresponding to the multiple links {L(i)} (e.g., the links L1, L2 and L3). For brevity, similar descriptions for this embodiment are not repeated in detail here.

Figure 6:
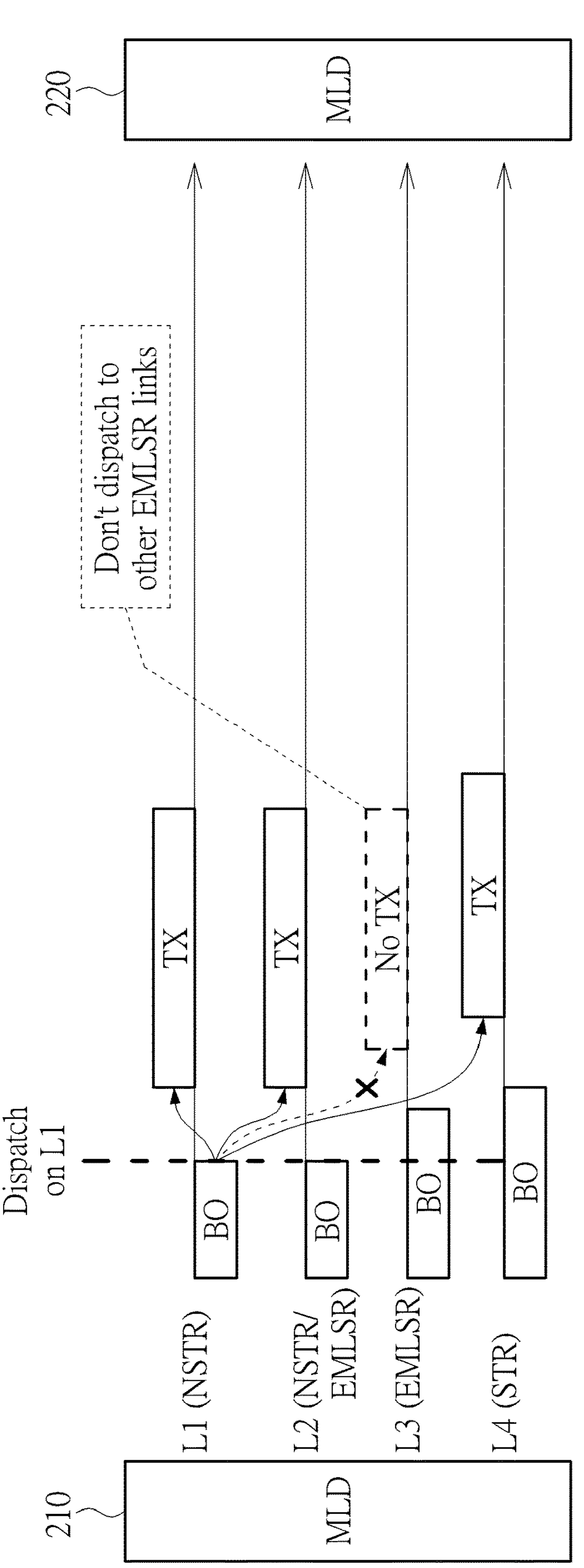
FIG. 6 is a diagram illustrating a third control scheme of the method according to an embodiment of the present invention.

FIG. 6 is a diagram illustrating a third control scheme of the method according to an embodiment of the present invention. For example, the multiple links {L(i)} may comprise the links {L1, L2, L3, L4}. In addition, according to a first predetermined rule among the aforementioned at least one predetermined rule, if one of multiple synchronization (Sync) start links (e.g., the links L1 and L2) among the multiple links {L(i)}, such as the link L2, is a first EMLSR link among the multiple EMLSR links (e.g., the links L2 and L3), the wireless transceiver device (e.g., the MLD 210) may dispatch the one set of MPDUs into the first EMLSR link, and prevent dispatching any MPDU among the multiple MPDUs into any other EMLSR link (e.g., the link L3) among the multiple EMLSR links (e.g., the links L2 and L3), where the aforementioned one EMLSR link may represent the first EMLSR link such as the link L2. In addition, the multiple Sync start links (e.g., the links L1 and L2) may be nonsimultaneous transmit and receive (NSTR) links. For brevity, similar descriptions for this embodiment are not repeated in detail here.

Figure 7:
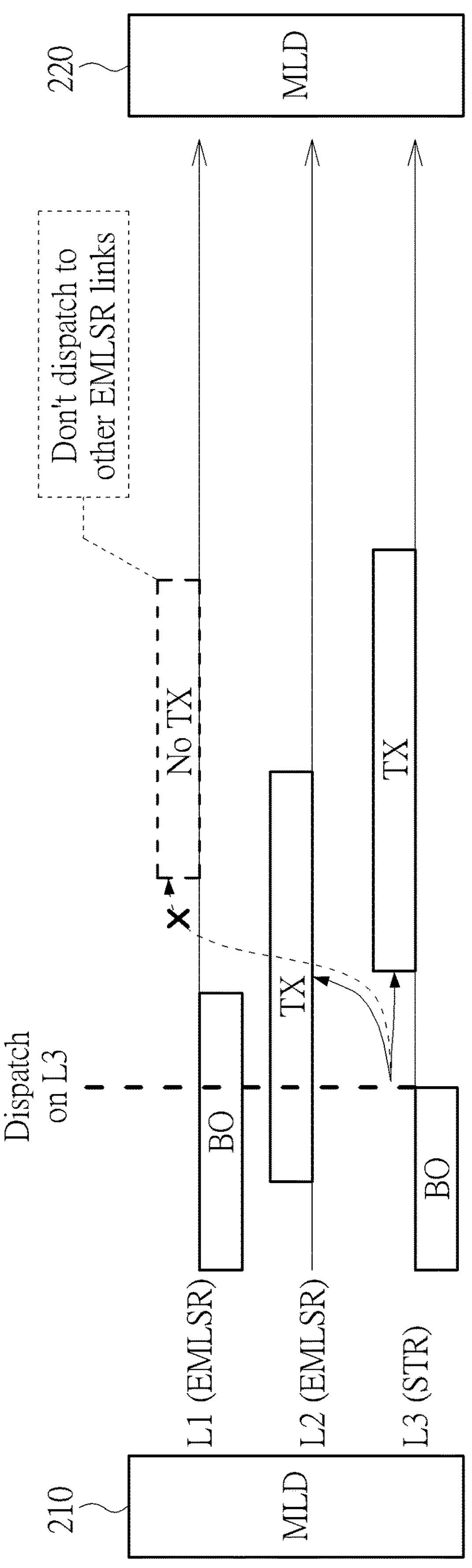
FIG. 7 is a diagram illustrating a fourth control scheme of the method according to an embodiment of the present invention.

FIG. 7 is a diagram illustrating a fourth control scheme of the method according to an embodiment of the present invention. For example, the multiple links {L(i)} may comprise the links {L1, L2, L3}. In addition, according to a second predetermined rule among the aforementioned at least one predetermined rule, if a first EMLSR link (e.g., the link L2) among the multiple EMLSR links (e.g., the links L1 and L2) is under transmission, the wireless transceiver device (e.g., the MLD 210) may dispatch the one set of MPDUs into the first EMLSR link (e.g., the link L2), and prevent dispatching any MPDU among the multiple MPDUs into any other EMLSR link (e.g., the link L1) among the multiple EMLSR links (e.g., the links L1 and L2), and further dispatch the other set of MPDUs into the STR link such as the link L3, where the aforementioned one EMLSR link may represent the first EMLSR link (e.g., the link L2). For brevity, similar descriptions for this embodiment are not repeated in detail here.

Figure 8:
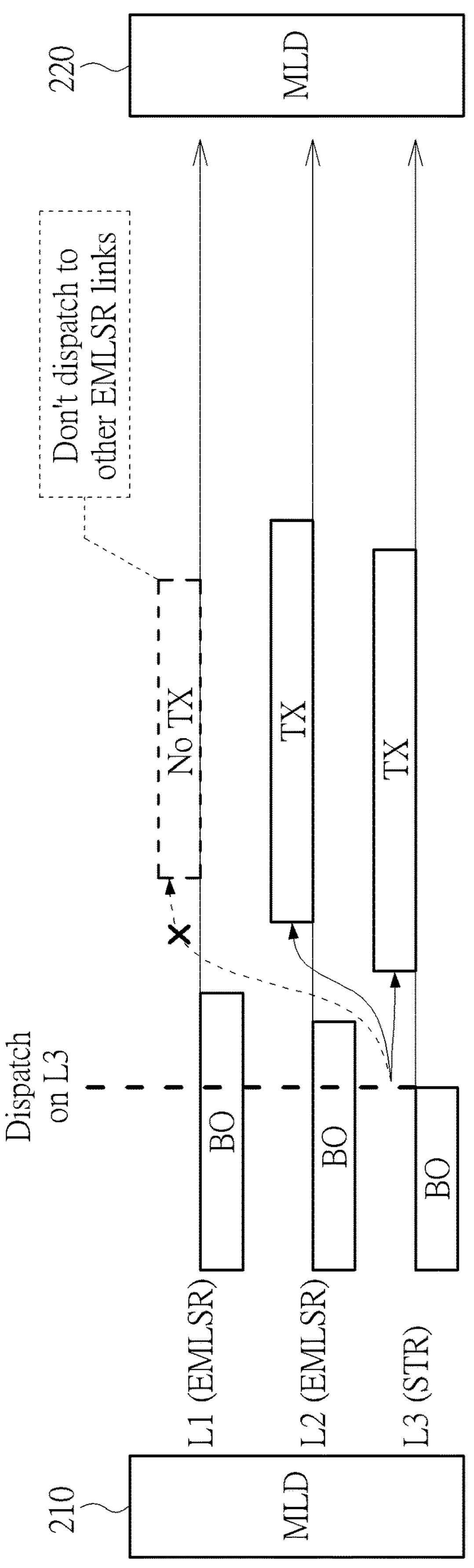
FIG. 8 is a diagram illustrating a fifth control scheme of the method according to an embodiment of the present invention.

FIG. 8 is a diagram illustrating a fifth control scheme of the method according to an embodiment of the present invention. For example, the multiple links {L(i)} may comprise the links {L1, L2, L3}. In addition, according to a third predetermined rule among the aforementioned at least one predetermined rule, if a backoff counter corresponding to a first EMLSR link (e.g., the link L2) among the multiple EMLSR links (e.g., the links L1 and L2) has a minimum backoff counter value among the backoff counter values {Backoff_CNT(i)} of all backoff counters {BC(i)} corresponding to the multiple EMLSR links (e.g., the links L1 and L2), the wireless transceiver device (e.g., the MLD 210) may dispatch the one set of MPDUs into the first EMLSR link (e.g., the link L2), and prevent dispatching any MPDU among the multiple MPDUs into any other EMLSR link (e.g., the link L1) among the multiple EMLSR links (e.g., the links L1 and L2), where the aforementioned one EMLSR link may represent the first EMLSR link (e.g., the link L2). For brevity, similar descriptions for this embodiment are not repeated in detail here.

In the embodiments described above, it may be assumed that the respective capabilities (e.g., the bandwidths) of the multiple links {L(i)} (e.g., the links L1, L2 and L3) are equal to each other, but the present invention is not limited thereto. According to some embodiments, the respective capabilities (e.g., the bandwidths) of the multiple links {L(i)} may vary, and the respective numbers of MPDUs to be dispatched into the PPDUs for being sent through the set of selected links $\{L_{SEL}\}$ may vary correspondingly, and more particularly, may be arranged to correspond to the respective capabilities (e.g., the bandwidths) of the set of selected links $\{L_{SEL}\}$, respectively. For example, assuming that the bandwidths BW1, BW2 and BW3 of the links L1, L2 and L3 (e.g., the 6-GHz link, the 5-GHz link and the 2.4-GHz link) are 320 megahertz (MHz), 160 MHz and 40 MHz, respectively, the wireless transceiver device (e.g., the MLD 210) may determine or update the dispatching weightings {DW} of the set of selected links $\{L_{SEL}\}$ as follows:

(1) if the members of the set of selected links $\{L_{SEL}\}$ are the links L1 and L2 (e.g., the 6-GHz link and the 5-GHz link), the wireless transceiver device (e.g., the MLD 210) may determine or update the dispatching weightings DW1 and DW2 of the links L1 and L2 according to the bandwidths BW1 and BW2 (e.g., 320 MHz and 160 MHz) of the links L1 and L2, and more particularly, determine that DW1=(320/(320+160)) and DW2=(160/(320+160)) and/or control DW1:DW2=(320/(320+160)):(160/(320+160))=320:160=2:1, where the wireless transceiver device (e.g., the MLD 210) may dispatch the MPDUs into the PPDU for being sent to the other device (e.g., the MLD 220) through the links L1 and L2 according to the dispatching ratio of the dispatching weightings DW1 and DW2 (e.g., the ratio of the dispatching weighting DW1 to the dispatching weighting DW2, or DW1:DW2=2:1), for example, when the capability of the BA bitmap is equal to 1024, the MLD 210 may dispatch approximately (2/(2+1)) of 1024 MPDUs to the link L1 and dispatch approximately (1/(2+1)) of 1024 MPDUs to the link L2;

(2) if the members of the set of selected links $\{L_{SEL}\}$ are the links L1 and L3 (e.g., the 6-GHz link and the 2.4-GHz link), the wireless transceiver device (e.g., the MLD 210) may determine or update the dispatching weightings DW1 and DW3 of the links L1 and L3 according to the bandwidths BW1 and BW3 (e.g., 320 MHz and 40 MHz) of the links L1 and L3, and more particularly, determine that DW1=(320/(320+40)) and DW3=(40/(320+40)) and/or control DW1:DW3=(320/(320+40)):(40/(320+40))=320:40=8:1, where the wireless transceiver device (e.g., the MLD 210) may dispatch the MPDUs into the PPDU for being sent to the other device (e.g., the MLD 220) through the links L1 and L3 according to the dispatching ratio of the dispatching weightings DW1 and DW3 (e.g., the ratio of the dispatching weighting DW1 to the dispatching weighting DW3, or DW1:DW3=8:1), for example, when the capability of the BA bitmap is equal to 1024, the MLD 210 may dispatch approximately (8/(8+1)) of 1024 MPDUs to the link L1 and dispatch approximately (1/(8+1)) of 1024 MPDUs to the link L3; and (3) if the members of the set of selected links $\{L_{SEL}\}$ are the links L2 and L3 (e.g., the 5-GHz link and the 2.4-GHz link), the wireless transceiver device (e.g., the MLD 210) may determine or update the dispatching weightings DW2 and DW3 of the links L2 and L3 according to the bandwidths BW2 and BW3 (e.g., 160 MHz and 40 MHZ) of the links L2 and L3, and more particularly, determine that DW2=(160/(160+40)) and DW3=(40/(160+40)) and/or control DW2:DW3=(160/(160+40)):(40/(160+40))=160:40=4:1, where the wireless transceiver device (e.g., the MLD 210) may dispatch the MPDUs into the PPDU for being sent to the other device (e.g., the MLD 220) through the links L2 and L3 according to the dispatching ratio of the dispatching weightings DW2 and DW3 (e.g., the ratio of the dispatching weighting DW2 to the dispatching weighting DW3, or DW2:DW3=4:1), for example, when the capability of the BA bitmap is equal to 1024, the MLD 210 may dispatch approximately (4/(4+1)) of 1024 MPDUs to the link L2 and dispatch approximately (1/(4+1)) of 1024 MPDUs to the link L3; where the bandwidths {BW(i)} (e.g., the bandwidths {BW1, BW2, . . . }) of the multiple links {L(i)} (e.g., the links {L1, L2, . . . }) may be used as MPDU good factors (MGFs) {MGF(i)} (e.g., the MGFs {320, 160, 40}) by the wireless transceiver device during the above operations of calculating the dispatching ratios of the dispatching weightings {DW(i)} (e.g., the dispatching weightings {DW1, DW2, . . . }), but the present invention is not limited thereto. According to some embodiments, the bandwidths BW1, BW2 and BW3 of the links L1, L2 and L3 (e.g., the 6-GHz link, the 5-GHz link and the 2.4-GHz link), the link count $LCNT_{SEL}$ of the set of selected links $\{L_{SEL}\}$, and/or the members of the set of selected links $\{L_{SEL}\}$ may vary, and the associated operations may vary correspondingly.

Figure 9:
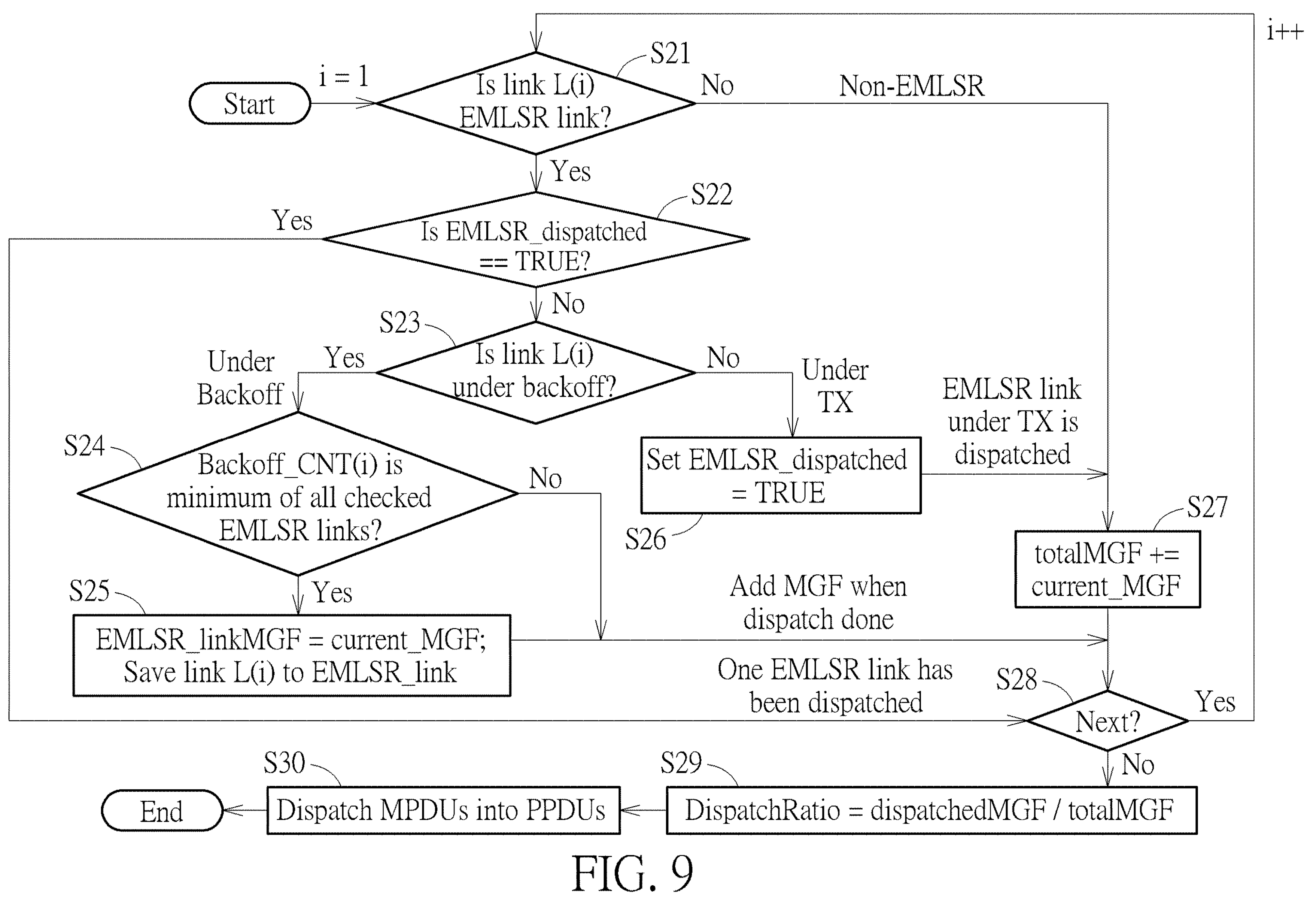
FIG. 9 illustrates a working flow of the method according to an embodiment of the present invention.

FIG. 9 illustrates a working flow of the method according to an embodiment of the present invention. For example, the wireless transceiver device (e.g., the MLD 210) may perform the dispatch control procedure according to the working flow shown in FIG. 9, and more particularly, set an initial value of the index i to be a predetermined initial value such as one (labeled "i=1" for brevity), and increase the index i with a predetermined increment such as one (labeled "i++" for brevity), to control the associated operations.

In Step S21, the wireless transceiver device (e.g., the MLD 210) may determine whether the current link L(i) is an EMLSR link. If Yes, Step S22 is entered; if No, Step S27 is entered, where the current link L(i) is a non-EMLSR link.

In Step S22, the wireless transceiver device (e.g., the MLD 210) may determine whether the flag EMLSR_dispatched is equal to the logical value TRUE (labeled "EMLSR_dispatched==TRUE" for brevity). If Yes, Step S28 is entered; if No, Step S23 is entered. For example, the flag EMLSR_dispatched being equal to the logical value TRUE may indicate that one EMLSR link such as the current link L(i) has been dispatched, and the flag EMLSR_dispatched being not equal to the logical value TRUE (or the flag EMLSR_dispatched being equal to the logical value FALSE) may indicate that the current link L(i) has not been dispatched, where the logical values TRUE and FALSE may represent the logical values 1 and 0, but the present invention is not limited thereto.

In Step S23, the wireless transceiver device (e.g., the MLD 210) may determine whether the current link L(i) is under backoff according to the backoff counter value Backoff_CNT(i) of the backoff counter BC(i) corresponding to the link L(i). If Yes (e.g., the backoff counter value Backoff_CNT(i) of the backoff counter BC(i) corresponding to the link L(i) has not reached the predetermined backoff termination value such as zero), Step S24 is entered; if No (e.g., the backoff counter value Backoff_CNT(i) of the backoff counter BC(i) corresponding to the link L(i) has reached the predetermined backoff termination value such as zero), Step S26 is entered, where the current link L(i) is under transmission (labeled "Under TX" for brevity).

In Step S24, the wireless transceiver device (e.g., the MLD 210) may determine whether the backoff counter value Backoff_CNT(i) of the backoff counter BC(i) corresponding to the current link L(i) is the minimum of the backoff counter values {Backoff_CNT(i)} of the backoff counters {BC(i)} corresponding to all checked EMLSR links {L(i)} (labeled "Backoff_CNT(i) is minimum of all checked EMLSR links" for brevity). If Yes, Step S25 is entered; if No, Step S28 is entered.

In Step S25, the wireless transceiver device (e.g., the MLD 210) may set the parameter EMLSR_linkMGF to be equal to the current MGF(i) of the current link L(i), for indicating that the MGF(i) of the aforementioned one EMLSR link is equal to the MGF(i) of the current link L(i) (labeled "EMLSR_linkMGF=current_MGF" for brevity), and save the link L(i) (or a link identifier (ID) thereof for indicating the link L(i)) to the parameter EMLSR_link for indicating that the aforementioned one EMLSR link is the current link L(i).

In Step S26, the wireless transceiver device (e.g., the MLD 210) may set EMLSR_dispatched=TRUE.

In Step S27, the wireless transceiver device (e.g., the MLD 210) may update the total MGF totalMGF of the set of selected links $\{L_{SEL}\}$ to be the original value of the total MGF totalMGF plus the current MGF(i) of the current link L(i) (labeled "totalMGF+=current_MGF" for brevity).

In Step S28, the wireless transceiver device (e.g., the MLD 210) may determine whether a next link L(i) exists, for example, according to a comparison result obtained from comparing the index i with the total link count $LCNT_{TOTAL}$. If Yes (e.g., $i<LCNT_{TOTAL}$), Step S21 is entered; if No (e.g., $i=LCNT_{TOTAL}$), Step S29 is entered.

In Step S29, the wireless transceiver device (e.g., the MLD 210) may calculate the dispatching ratios {DispatchRatio} of the set of selected links $\{L_{SEL}\}$ according to the dispatched MGFs {dispatchedMGF} and the total MGF totalMGF, and more particularly, perform another loop with another index j as follows:

$$\text{DispatchRatio}(j)=\text{dispatchedMGF}(j)/\text{totalMGF};$$

where the dispatched MGF dispatchedMGF(j) may represent the MGF of any link L(j) among the set of selected links $\{L_{SEL}\}$, and the dispatching ratio DispatchRatio(j) may represent the dispatching ratio of the aforementioned any link L(j) among the set of selected links $\{L_{SEL}\}$.

In Step S30, the wireless transceiver device (e.g., the MLD 210) may dispatch the MPDUs into the PPDUs according to the dispatching ratios {DispatchRatio} of the set of selected links $\{L_{SEL}\}$, for transmitting the PPDUs carrying the MPDUs to the other device (e.g., the MLD 220) through the set of selected links $\{L_{SEL}\}$.

For better comprehension, the method may be illustrated with the working flow shown in FIG. 9, but the present invention is not limited thereto. According to some embodiments, one or more steps may be added, deleted, or changed in the working flow shown in FIG. 9. For example, before executing Step S21, the wireless transceiver device (e.g., the MLD 210) may set the flags {EMLSR_dispatched} corresponding to the multiple links {L(i)} to be equal to the logical value FALSE by default. In addition, the wireless transceiver device (e.g., the MLD 210) may add the MGF MGF(i) when the dispatch of the link L(i) is done. For brevity, similar descriptions for these embodiments are not repeated in detail here.

Figure 10:
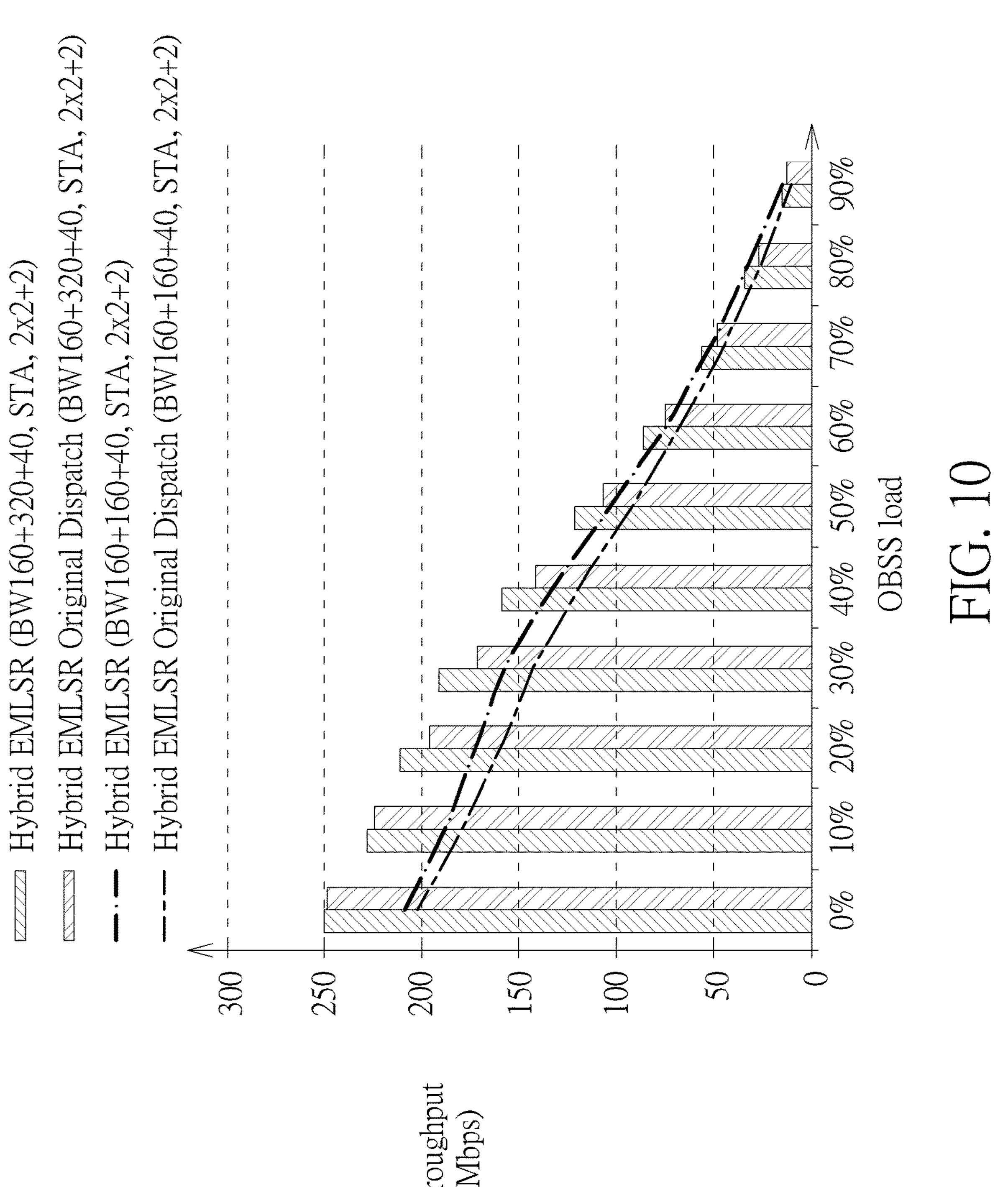
FIG. 10 illustrates some examples of the relationships between the throughput and the balanced overlapping basic service set (OBSS) load.

FIG. 10 illustrates some examples of the relationships between the throughput and the balanced OBSS load, where the horizontal axis may represent the OBSS load, and the vertical axis may represent the throughput, which may be measured in unit of megabits per second (Mbps). In a first case, the MLDs 210 and 220 may operate in the hybrid mode with {BW1, BW2, BW3}={320, 160, 40} according to the method, for monitoring the throughput at the STA side such as the MLD 220 with antenna configuration of 2T×2R+2R (labeled "Hybrid EMLSR (BW160+320+40, STA, 2×2+2)" for brevity). In a second case, the MLDs 210 and 220 may operate in the hybrid mode with {BW1, BW2, BW3}={320, 160, 40} according to the original dispatch process of the MLO control scheme shown in FIG. 2, for monitoring the throughput at the STA side such as the MLD 220 with antenna configuration of 2T×2R+2R (labeled "Hybrid EMLSR Original Dispatch (BW160+320+40, STA, 2×2+2)" for brevity). In a third case, the MLDs 210 and 220 may operate in the hybrid mode with {BW1, BW2, BW3}={160, 160, 40} according to the method, for monitoring the throughput at the STA side such as the MLD 220 with antenna configuration of 2T×2R+2R (labeled "Hybrid EMLSR (BW160+160+40, STA, 2×2+2)" for brevity). In a fourth case, the MLDs 210 and 220 may operate in the hybrid mode with {BW1, BW2, BW3}={160, 160, 40} according to the original dispatch process of the MLO control scheme shown in FIG. 2, for monitoring the throughput at the STA side such as the MLD 220 with antenna configuration of 2T×2R+2R (labeled "Hybrid EMLSR Original Dispatch (BW160+160+40, STA, 2×2+2)" for brevity).

Figure 11:
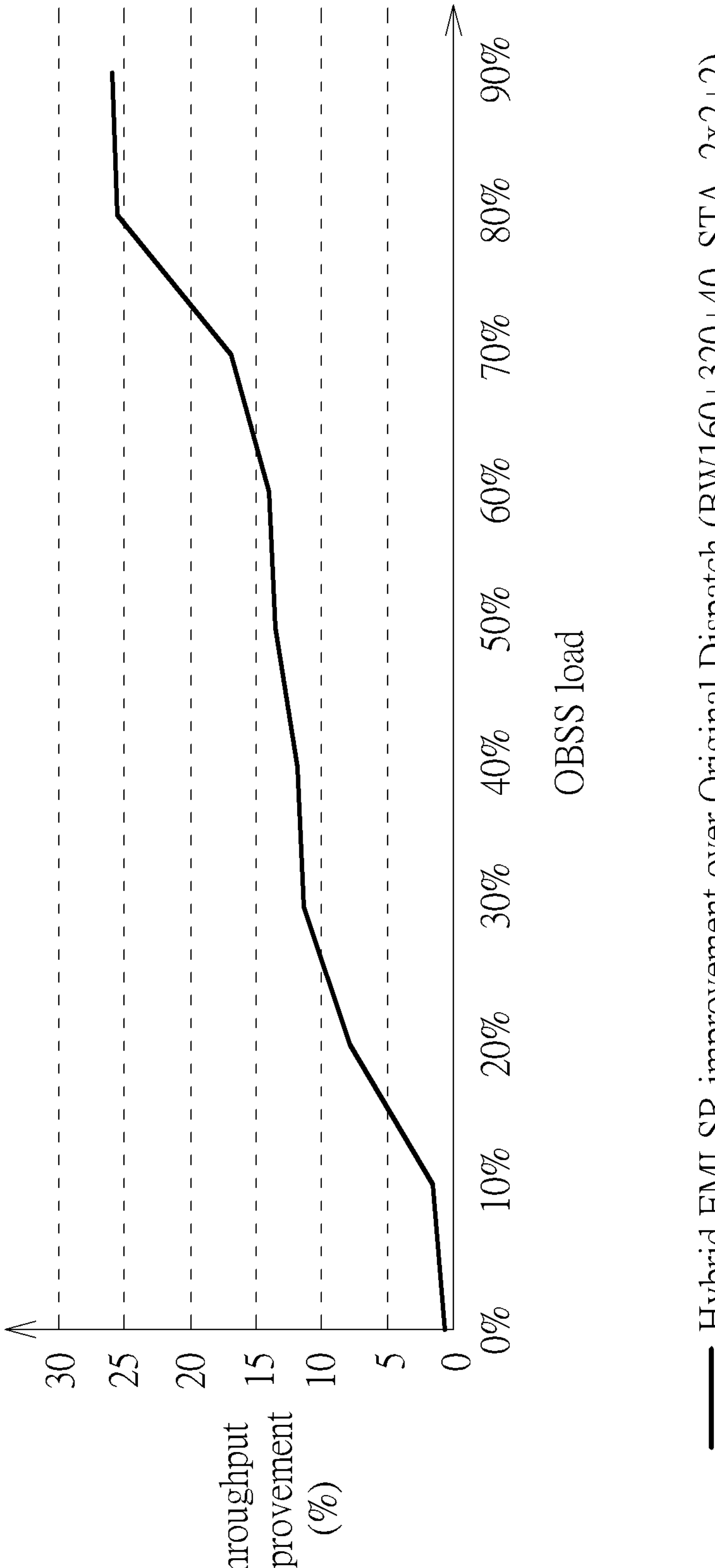
FIG. 11 illustrates an example of the relationship between the throughput improvement and the balanced OBSS load.

FIG. 11 illustrates an example of the relationship between the throughput improvement and the balanced OBSS load, where the horizontal axis may represent the OBSS load, and the vertical axis may represent the throughput improvement. The curve shown in FIG. 11 may be obtained by calculating the ratio of the throughput of the first case (in which the MLDs 210 and 220 may operate in the hybrid mode with {BW1, BW2, BW3}={320, 160, 40} according to the method) to the throughput of the second case (in which the MLDs 210 and 220 may operate in the hybrid mode with {BW1, BW2, BW3}={320, 160, 40} according to the original dispatch process of the MLO control scheme shown in FIG. 2) with respect to the OBSS load.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing medium access control (MAC) protocol data unit (MPDU) dispatch control in multi-link operation (MLO) architecture, the method being applicable to a wireless transceiver device within a wireless communications system, the method comprising:

utilizing the wireless transceiver device to communicate with another device within the wireless communications system, to allow data transmission between the wireless transceiver device and the other device through at least one portion of links among multiple links respectively corresponding to multiple predetermined radio frequency bands; and performing a dispatch control procedure to dispatch multiple MAC protocol data units (MPDUs) into multiple physical layer (PHY) protocol data units (PPDUs) corresponding to a set of selected links according to at least one predetermined rule in a predetermined mode of the wireless transceiver device, for sending the multiple PPDUs to the other device through the set of selected links, wherein the predetermined mode represents a hybrid mode in which the multiple links comprise multiple enhanced multi-link single radio (EMLSR) links and at least one simultaneous transmit and receive (STR) link;

wherein according to the at least one predetermined rule, the wireless transceiver device is arranged to dispatch a set of MPDUs among the multiple MPDUs into a first EMLSR link among the multiple EMLSR links and dispatch another set of MPDUs among the multiple MPDUs into the at least one STR link, no matter whether a first backoff counter value of a first backoff counter corresponding to the first EMLSR link reaches a predetermined backoff termination value first among backoff counter values of all backoff counters respectively corresponding to the multiple links.

2. The method of claim 1, wherein the wireless transceiver device is arranged to configure one of the multiple EMLSR links and STR links in the hybrid mode.

3. The method of claim 1, wherein according to the at least one predetermined rule, the wireless transceiver device is arranged to dispatch the set of MPDUs among the multiple MPDUs into the first EMLSR link among the multiple EMLSR links, without dispatching any MPDU among the multiple MPDUs into any other EMLSR link among the multiple EMLSR links.

4. The method of claim 1, wherein according to the at least one predetermined rule, the wireless transceiver device is arranged to dispatch the set of MPDUs among the multiple MPDUs into one EMLSR link among the multiple EMLSR links, the one EMLSR link including the first EMLSR link.

5. The method of claim 4, wherein according to a second predetermined rule among the at least one predetermined rule, if the first EMLSR link among the multiple EMLSR links is under transmission, the wireless transceiver device is arranged to dispatch the set of MPDUs into the first EMLSR link, and prevent dispatching any MPDU among the multiple MPDUs into any other EMLSR link among the multiple EMLSR links, wherein the one EMLSR link represents the first EMLSR link.

6. The method of claim 4, wherein according to a third predetermined rule among the at least one predetermined rule, if the first backoff counter corresponding to the first EMLSR link among the multiple EMLSR links has a minimum backoff counter value among backoff counter values of all backoff counters corresponding to the multiple EMLSR links, the wireless transceiver device is arranged to dispatch the set of MPDUs into the first EMLSR link, and prevent dispatching any MPDU among the multiple MPDUs into any other EMLSR link among the multiple EMLSR links, wherein the one EMLSR link represents the first EMLSR link.

7. The method of claim 1, wherein the multiple MPDUs represent a group of MPDUs, and the multiple PPDUs represent multiple first PPDUs into which the group of MPDUs are dispatched; and the method further comprises:

performing the dispatch control procedure to dispatch another group of MPDUs into multiple second PPDUs corresponding to the set of selected links according to the at least one predetermined rule in the predetermined mode of the wireless transceiver device, for sending the multiple second PPDUs to the other device through the set of selected links.

8. The wireless transceiver device that operates according to the method of claim 1, wherein the wireless transceiver device is a multi-link device (MLD).

9. A method for performing medium access control (MAC) protocol data unit (MPDU) dispatch control in multi-link operation (MLO) architecture, the method being applicable to a wireless transceiver device within a wireless communications system, the method comprising:

utilizing the wireless transceiver device to communicate with another device within the wireless communications system, to allow data transmission between the wireless transceiver device and the other device through at least one portion of links among multiple links respectively corresponding to multiple predetermined radio frequency bands; and performing a dispatch control procedure to dispatch multiple MAC protocol data units (MPDUs) into multiple physical layer (PHY) protocol data units (PPDUs) corresponding to a set of selected links according to at least one predetermined rule in a predetermined mode of the wireless transceiver device, for sending the multiple PPDUs to the other device through the set of selected links, wherein the predetermined mode represents a hybrid mode in which the multiple links comprise multiple enhanced multi-link single radio (EMLSR) links and at least one simultaneous transmit and receive (STR) link;

wherein according to the at least one predetermined rule, the wireless transceiver device is arranged to dispatch a set of MPDUs among the multiple MPDUs into one EMLSR link among the multiple EMLSR links; and according to a first predetermined rule among the at least one predetermined rule, if one of multiple synchronization (Sync) start links among the multiple links is a first EMLSR link among the multiple EMLSR links, the wireless transceiver device is arranged to dispatch the set of MPDUs into the first EMLSR link, and prevent dispatching any MPDU among the multiple MPDUs into any other EMLSR link among the multiple EMLSR links, wherein the one EMLSR link represents the first EMLSR link.

10. The method of claim 9, wherein the multiple Sync start links are nonsimultaneous transmit and receive (NSTR) links.

11. A wireless transceiver device, for performing medium access control (MAC) protocol data unit (MPDU) dispatch control in multi-link operation (MLO) architecture, the wireless transceiver device being one of multiple devices within a wireless communications system, the wireless transceiver device comprising:

a processing circuit, arranged to control operations of the wireless transceiver device; and at least one communications control circuit, coupled to the processing circuit, arranged to perform communications control, wherein the at least one communications control circuit is arranged to perform wireless communications operations with another device among the multiple devices for the wireless transceiver device;

wherein:

the wireless transceiver device is arranged to communicate with the other device, to allow data transmission between the wireless transceiver device and the other device through at least one portion of links among multiple links respectively corresponding to multiple predetermined radio frequency bands; and the wireless transceiver device is arranged to perform a dispatch control procedure to dispatch multiple MAC protocol data units (MPDUs) into multiple physical layer (PHY) protocol data units (PPDUs) corresponding to a set of selected links according to at least one predetermined rule in a predetermined mode of the wireless transceiver device, for sending the multiple PPDUs to the other device through the set of selected links, wherein the predetermined mode represents a hybrid mode in which the multiple links comprise multiple enhanced multi-link single radio (EMLSR) links and at least one simultaneous transmit and receive (STR) link;

wherein according to the at least one predetermined rule, the wireless transceiver device is arranged to dispatch a set of MPDUs among the multiple MPDUs into a first EMLSR link among the multiple EMLSR links and dispatch another set of MPDUs among the multiple MPDUs into the at least one STR link, no matter whether a first backoff counter value of a first backoff counter corresponding to the first EMLSR link reaches a predetermined backoff termination value first among backoff counter values of all backoff counters respectively corresponding to the multiple links.

* * * * *